(12) United States Patent
Zhou et al.

(10) Patent No.: US 9,062,254 B2
(45) Date of Patent: Jun. 23, 2015

(54) TUNGSTATE FLUORESCENT MATERIALS AND PREPARATION METHODS THEREOF

(75) Inventors: Mingjie Zhou, Shenzhen (CN); Jun Liu, Shenzhen (CN); Wenbo Ma, Shenzhen (CN)

(73) Assignee: OCEAN'S KING LIGHTING SCIENCE & TECHNOLOGY CO., LTD., Shenzhen, Guangdong (CN)

( * ) Notice: Subject to any disclaimer, the term of this patent is extended or adjusted under 35 U.S.C. 154(b) by 197 days.

(21) Appl. No.: 13/881,683

(22) PCT Filed: Dec. 14, 2010

(86) PCT No.: PCT/CN2010/079767
§ 371 (c)(1),
(2), (4) Date: Apr. 25, 2013

(87) PCT Pub. No.: WO2012/079226
PCT Pub. Date: Jun. 21, 2012

(65) Prior Publication Data
US 2013/0214206 A1    Aug. 22, 2013

(51) Int. Cl.
| C09K 11/55 | (2006.01) |
| C09K 11/87 | (2006.01) |
| C09K 11/02 | (2006.01) |
| C09K 11/68 | (2006.01) |
| C09K 11/58 | (2006.01) |

(52) U.S. Cl.
CPC ............... *C09K 11/87* (2013.01); *C09K 11/025* (2013.01); *C09K 11/684* (2013.01); *C09K 11/873* (2013.01); *C09K 11/68* (2013.01); *C09K 11/58* (2013.01)

(58) Field of Classification Search
USPC ..................................................... 252/301.5
See application file for complete search history.

(56) References Cited

U.S. PATENT DOCUMENTS

| 5,644,193 | A | 7/1997 | Matsuda et al. | |
| 5,670,839 | A | 9/1997 | Noma et al. | |
| 2004/0212290 | A1 | 10/2004 | Ito et al. | |
| 2009/0022766 | A1* | 1/2009 | Geddes | ............ 424/401 |

FOREIGN PATENT DOCUMENTS

| CN | 101760198 A | 6/2010 |
| JP | S53-007589 A | 1/1978 |
| JP | 2001261611 A | 9/2001 |
| JP | 2002311234 A | 10/2002 |
| JP | 2008051626 A | 3/2008 |
| JP | 101899308 A | 12/2010 |

OTHER PUBLICATIONS

Yang Zhiping, et al, Synthesis and Properties of CaWO4 Nanocrystals for X-ray Intensifying Screen by Pechini Sol-gel Process, Chinese Journal of Luminescence, vol. 29, No, 2, pp. 279-282, Apr. 2008.
Fang Lei, Bing Yan, Hydrothermal synthesis and luminescence of CaMO4:RE3+ (M=W, Mo; RE=Eu, Tb) submicro-phosphors, Journal of Solid State Chemistry 181 (2008) 855-862, Available Online Feb. 5, 2008.
Dolgov L et al: "Structure and fluorescent properties of Ti02:Sm<3+>-Ag composite". Optical Materials. Elsevier Science Publishers B.V. Amsterdam. NL. vol. 32. No. 11. Jul. 16, 2010 • pp. 1540-1544. XP027231499. ISSN: 0925-3467.
Arora, S. K. et al., Crystallization and Optical Properties of CaW04 and SrW04, Crystal Research and Technology, 2006, vol. 41, No. 11, pp. 1089-1095, especially experimental section, CODEN: CRTEDF. ISSN: 0232-1300.
Min Y. L. et al., Au@Y20 3:Eu3 + Rare Earth Oxide Hollow Sub-Microspheres with Encapsulated Gold Nanoparticles and Their Optical Properties, Solid State Sciences, 2009, vol. 11, No. 1, pp. 96-101, especially experimental section and fig. 6, CODEN: SSSCFJ. ISSN: 1293-2558.

* cited by examiner

*Primary Examiner* — Carol M Koslow
(74) *Attorney, Agent, or Firm* — Shimokaji & Associates, P.C.

(57) ABSTRACT

Tungstate luminescent materials and preparation methods thereof are provided. The said luminescent materials are represented by the following general formula: $RWO_4:xM$, wherein R is selected from one or two of Ca, Sr or Ba, M is selected from one or two of Ag, Au, Pt or Pd metal nanoparticles; $0<x\leq1\times10^{-3}$. The said luminescent materials have excellent chemical stability and high luminous intensity. The said preparation methods have simple technique, no pollution, manageable process conditions and low equipment requirement, and are beneficial to industry production.

5 Claims, 2 Drawing Sheets

TUNGSTATE FLUORESCENT MATERIALS AND PREPARATION METHODS THEREOF

FIELD OF THE INVENTION

The present invention relates to luminescent materials, more particularly, relates to a modified tungstate fluorescent powders. The present invention also relates to preparation methods of tungstate fluorescent powders.

BACKGROUND OF THE INVENTION

In recent years, it has been found that $WO_4^{2-}$ can be used as broadband blue light emission group; thus, there is also strong interest in luminescence properties of cathode ray equipped with tungstate, and considerable efforts is being directed toward it. Nowadays, it is widely used in the fields of the photoluminescence, microwave applications, optical fiber, scintillation crystal, humidity sensor, magnetic properties, and catalyst. For example, calcium tungstate is good fluorescent powder used in X-ray intensifying screen. However, $WO_4^{2-}$ can be used as broadband blue light emission group, the prominent drawback of it is that the luminous intensity is low.

SUMMARY OF THE INVENTION

Solving the above problems, the present invention provides tungstate fluorescent powders consisting of xM nanoparticles and $RWO_4$; wherein, R is one or two metal elements of Ca, Sr and Ba; M is one or two metal nano-particles of Ag, Au, Pt and Pd; x is molar ratio of M nano-particles to $RWO_4$, x is in the range of $0<x\leq1\times10^{-3}$.

The other purpose of the present invention is to provide a preparation method of tungstate fluorescent powders, comprising:

Firstly, preparation of M nano-particles collosol
1) weighing and dissolving compound used as source of M in solvent to prepare and dilute solution containing M ions; wherein, M is one or two kinds of metal nano-particles of Ag, Au, Pt and Pd, the compound used as source of M is one or two of silver nitrate, chloroauric acid, chloroplatinic acid and palladium chloride, the solvent is water or mixed solvent of ethanol and water in volume ratio of 1:7~4:1;
2) while magnetically stirring, dissolving assistant agent in said solution containing M ions of 1), and obtaining a mass concentration of assistant agent in the solution containing M ions, which is in the range of $1.5\times10^{-4}$ g/mL~$2.1\times10^{-3}$ g/mL; wherein, the assistant agent is at least one of polyvinyl pyrrolidone (PVP), sodium citrate, cetyl trimethyl ammonium bromide, sodium dodecyl sulfate and sodium dodecyl sulfonate;
3) weighing and dissolving matters of reducing agent in solvent to prepare a reducing agent solution having a molar concentration in the range of $1\times10^{-3}$ mol/L~$1\times10^{-2}$ mol/L; the matters of reducing agent is hydrazine hydrate, ascorbic acid or sodium borohydride; the solvent is water or mixed solution of ethanol and water in volume ratio of 1:9~2:1;
4) while magnetically stirring, adding the reducing solution obtained from 3) into the solution obtained from 2) according to the molar ratio of reducing agent to metal ions which is in the range of 1.2:1~4.8:1 to carry out redox reaction for 10~45 min, then obtaining M nano-particles collosol;
5) weighing and adding surface treating agent into the M nano-particles collosol prepared in 4), stirring for 3~24 h, then obtaining the surface treated M nano-particles collosol, wherein mass concentration of the surface treating agent in M nano-particles collosol is in the range of 0.001 g/mL~0.1 g/mL; the surface treating agent is polyvinyl pyrrolidone (PVP).

Secondly, preparation of fluorescent powders consisting of xM nanoparticles and $RWO_4$ As for the preparation of fluorescent powders consisting of xM nanoparticles and $RWO_4$, the two following methods can be employed:

Method 1: Pechini Sol-Gel Method
6) adding R salts (e.g. $R(NO_3)_2$) solution and tungstate (e.g. $(NH_4)_2WO_4$ or $(NH_4)_{10}H_2(W_2O_7)_6$) solution into a beaker (wherein, the molar ratio of $R^{2+}$ to $WO_4^{2-}$ is in the range of 1:1~1:1.25) according to the general formula $RWO_4$:xM (wherein, R is one or two metal elements of Ca, Sr and Ba); then adding ethanol, stirring thoroughly to obtain mixed solution containing R ions and tungstate ions; then adding mixed solution of ethanol and water containing citric acid that acts as a chelating agent, and adding polyethylene glycol (PEG, having relative molecular mass of 2000~20000, preferably 10000, the mass concentration of PEG is in the range of 0.01~0.1 g/ml) that acts as a cross-linking agent according to the volume of solution at that moment; then regulating the pH value of the mixed solution to keep in the range of 2~4 to obtain chelate solution; wherein, citric acid is citric acid monohydrate, molar ratio of the citric acid to total amount of R ions of the mixed solution is in the range of 1:1~6:1; because a few of tungstate ions are volatilized during the calcination, therefore, the tungstate raw materials should be in excess by 1%~25% when preparing tungstate solution;
7) adding the surface treated M nano-particles collosol of 5) into the chelate solution of 6) according to the molar ratio x ($0<x\leq1\times10^{-3}$) of M nano-particles to $RWO_4$ in the general formula of $RWO_4$:xM; after drying at 80~50° C., the gel is obtained; placing the gel into high temperature furnace, heat treating at 600~900° C. for 0.5~7 h, cooling to room temperature, after grinding, tungstate fluorescent powders consisting of xM nanoparticles and $RWO_4$ is obtained.

Method 2: Hydrothermal Method
6') adding tungstate (e.g. $(NH_4)_2WO_4$ or $Na_2WO_4$) solution into a beaker according the molar ratio x ($0<x\leq1\times10^{-3}$) of M nano-particles to $RWO_4$ in the general formula of $RWO_4$:xM, then adding the surface treated M nano-particles collosol of 5), stirring for 10 min~60 min to obtain mixed solution; wherein R is one or two metal elements of Ca, Sr and Ba;
7') dripping R salts (e.g. $R(NO_3)_2$) solution, whose amount is as much as that of tungstate of 6'), into the mixed solution of 6') to regulate the pH value of mixed solution to keep it in the range of 8~12, stirring for 0.5~4 h, then obtaining alkaline mixed solution;
8') transferring alkaline mixed solution of 7') to hydrothermal reactor, keeping the temperature constant at 120~250° C. for 12~72 h, cooling, taking out and filtrating, rinsing (e.g. rinsing with water, alcohols), drying to obtain powders;
9') placing dry powders in high temperature furnace, heat treating at 500~900° C. for 0.5~7 h, cooling to room temperature, after grinding, tungstate fluorescent powders represented by general formula of $RWO_4$:xM is obtained.

Compared to the prior art, the present invention has the following features:

1. The present invention is to dope fluorescent powders with metal particles, improves luminous intensity of fluorescent powders by plasma resonance;

2. The present invention is simple, pollution-free, easy to control, low demand in equipment, beneficial to industry production, can be widely used in the field of producing fluorescent powders.

DETAILED DESCRIPTION OF ILLUSTRATED EMBODIMENTS

The present invention provides tungstate fluorescent powders consisting of xM nanoparticles and $RWO_4$; wherein, R is one or two metal elements of Ca, Sr and Ba; M is one or two metal nano-particles of Ag, Au, Pt and Pd; x is molar ratio of M nano-particles to $RWO_4$, x is in the range of $0<x \leq 1 \times 10^{-3}$.

Figure 1:
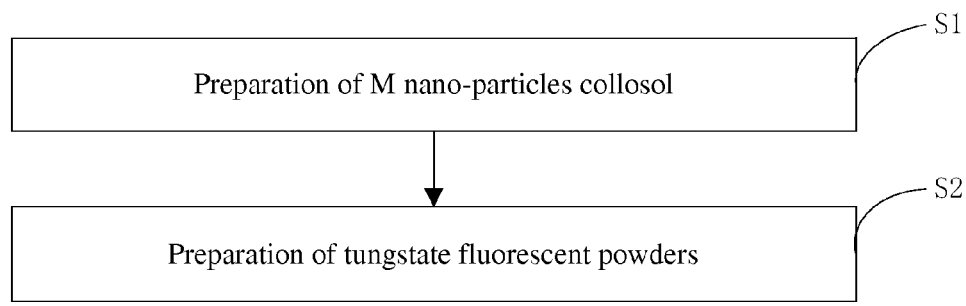
FIG. 1 is a flow chart of the preparation method of tungstate luminescent materials of the present invention.

As shown in FIG. 1, the preparation method of the above-mentioned tungstate fluorescent powders comprises:

Step S1, Preparation of M Nano-Particles Collosol 1) weighing and dissolving compound used as source of M in solvent to prepare and dilute solution containing M ions; wherein, M is one or two kinds of metal nano-particles of Ag, Au, Pt and Pd, the compound used as source of M is one or two of silver nitrate, chloroauric acid, chloroplatinic acid and palladium chloride, the solvent is water or mixed solvent of ethanol and water in volume ratio of 1:7~4:1;

2) while magnetically stirring, dissolving assistant agent in said solution containing M ions of 1), and obtaining a mass concentration of assistant agent in the solution containing M ions, which is in the range of $1.5 \times 10^{-4}$ g/mL~$2.1 \times 10^{-3}$ g/mL; wherein, the assistant agent is at least one of polyvinyl pyrrolidone (PVP), sodium citrate, cetyl trimethyl ammonium bromide, sodium dodecyl sulfate and sodium dodecyl sulfonate;

3) weighing and dissolving matters of reducing agent in solvent to prepare a reducing agent solution having a molar concentration of $1 \times 10^{-3}$ mol/L~$1 \times 10^{-2}$ mol/L; the matters of reducing agent is hydrazine hydrate, ascorbic acid or sodium borohydride; the solvent is water or mixed solution of ethanol and water in volume ratio of 1:9~2:1;

4) while magnetically stirring, adding the reducing solution obtained from 3) into the solution obtained from 2) according to the molar ratio of reducing agent to metal ions which is in the range of 1.2:1~4.8:1 to carry out redox reaction for 10~45 min, then obtaining M nano-particles collosol;

5) weighing and adding surface treating agent into the M nano-particles collosol prepared in 4), stirring for 3~24 h, then obtaining the surface treated M nano-particles collosol, wherein mass concentration of the surface treating agent is in the range of 0.001 g/mL~0.1 g/mL; the surface treating agent is polyvinyl pyrrolidone (PVP).

Step S2: preparation of fluorescent powders consisting of xM nanoparticles and $RWO_4$ As for the preparation of fluorescent powders consisting of xM nanoparticles and $RWO_4$, the two following methods can be employed:

Method 1: Pechini Sol-Gel Method 6) adding R salts (e.g. $R(NO_3)_2$) solution and tungstate (e.g. $(NH_4)_2WO_4$ or $(NH_4)_{10}H_2(W_2O_7)_6$) solution into a beaker (wherein, the molar ratio of $R^{2+}$ to $WO_4^{2-}$ is in the range of 1:1~1:1.25) according to the general formula $RWO_4:xM$ (wherein, R is one or two metal elements of Ca, Sr and Ba); then adding ethanol, stirring thoroughly to obtain mixed solution of containing R ions and tungstate ions; then adding mixed solution of ethanol and water containing citric acid that acts as a chelating agent, and adding polyethylene glycol (PEG, having relative molecular mass of 2000~20000, preferably 10000, the mass concentration of PEG is in the range of 0.01~0.1 g/ml) that acts as a cross-linking agent according to the volume of solution at that moment; then regulating the pH value of the mixed solution to keep in the range of 2~4 to obtain chelate solution; wherein, citric acid is citric acid monohydrate, molar ratio of the citric acid to total amount of R ions of the mixed solution is in the range of 1:1~6:1; because a few of tungstate ions are volatilized during the calcination, therefore, the tungstate raw materials should be in excess by 1%~25% when preparing tungstate solution;

7) adding the surface treated M nano-particles collosol of 5) into the chelate solution of 6) according to the molar ratio x ($0<x \leq 1 \times 10^{-3}$) of M nano-particles to $RWO_4$ in the general formula of $RWO_4:xM$; after drying at 80~150° C., the gel is obtained; placing the gel into high temperature furnace, heat treating at 600~900° C. for 0.5~7 h, cooling to room temperature, after grinding, tungstate fluorescent powders consisting of xM nanoparticles and $RWO_4$ is obtained.

Method 2: Hydrothermal Method

6') adding tungstate (e.g. $(NH_4)_2WO_4$ or $Na_2WO_4$) solution into a beaker according to the molar ratio x ($0<x \leq 1 \times 10^{-3}$) of M nano-particles to $RWO_4$ in the general formula of $RWO_4:xM$, then adding the surface treated M nano-particles collosol of 5), stirring for 10 min~60 min to obtain mixed solution; wherein R is one or two metal elements of Ca, Sr and Ba;

7') dripping R salts (e.g. $R(NO_3)_2$) solution, whose amount is as much as that of tungstate of 6'), into the mixed solution of 6') to regulate the pH value of mixed solution to keep in the range of 8~12, stirring for 0.5~4 h, then obtaining alkaline mixed solution;

8') transferring alkaline mixed solution of 7') to hydrothermal reactor, keeping the temperature constant at 120~250° C. for 12~72 h, cooling, taking out and filtrating, rinsing (e.g. rinsing with water, alcohols), drying to obtain powders;

9') placing dry powders in high temperature furnace, heat treating at 500~900° C. for 0.5~7 h, cooling to room temperature, after grinding, tungstate fluorescent powders represented by general formula of $RWO_4:xM$ is obtained.

Further description of the present invention will be illustrated, which combined with preferred embodiments in the drawings.

Example 1

Preparation of Pt Nano-Particles Collosol

Weighing and dissolving 5.18 mg of chloroplatinic acid ($H_2PtCl_6 \cdot 6H_2O$) in 17 mL of deionized water; after chloroplatinic acid dissolved completely, weighing and dissolving 8 mg of sodium citrate and 12 mg of sodium dodecyl sulfonate in the aqueous solution of chloroplatinic acid under the condition of magnetic stirring; weighing and dissolving 0.38 mg of sodium borohydride in mixed solution of 9 mL of deionized water and 1 mL of ethanol, obtaining 10 mL of $1 \times 10^{-3}$ mol/L aqueous solution of sodium borohydride, preparing 10 mL of $1\times10^{-2}$ mol/L hydrazine hydrate solution at the same time; under the condition of magnetic stirring, adding 0.4 mL aqueous solution of sodium borohydride into the aqueous solution of chloroplatinic acid, stirring and reacting for 5 min, and then adding 2.6 mL of $1\times10^{-2}$ mol/L hydrazine hydrate solution into the aqueous solution of chloroplatinic acid, continue to react for 40 min, then obtaining 20 mL of Pt nano-particles collosol containing $5\times10^{-4}$ mol/L of Pt; then adding 2.0 mg of PVP into Pt nano-particles collosol, magnetically stirring for 12 h. The surface-treated Pt nano-particles were obtained.

Preparation of 0.01 mol of $CaWO_4:1\times10^{-3}Pt$

Pipetting 10 mL of 1 mol/L $Ca(NO_3)_3$ solution, 10.1 mL of 1 mol/L $(NH_4)_2WO_4$ solution (excess 1%) and adding into a beaker, then adding 20 mL of ethanol, stirring thoroughly to obtain mixed solution of nitrate, adding citric acid of 5 mL-water-20 mL-ethanol (containing 2.1014 g of citric acid monohydrate; the molar ratio of the citric acid to total amount of ions of the mixed solution is 1:1) and 0.65 g of PEG (0.01 g/ml, PEG having a relative molecular mass of 2000) into the mixed solution, stirring thoroughly, regulating the pH value of reaction solution to about 2; taking 20 mL of the above-mentioned treated metal particles solution, heating in a water bath at 60° C. while stirring for 16 h to obtain collosol; completely drying the collosol at 80° C. to obtain gel; placing the gel into high temperature furnace, calcining at 600° C. for 7 h, cooling to room temperature, fluorescent powders $CaWO_4:1\times10^{-3}Pt$ were obtained after grinding.

Example 2

Preparation of Au Nano-Particles Collosol

Weighing and dissolving 4.12 mg of chloroauric acid $(AuCl_3 \cdot HCl \cdot 4H_2O)$ in mixed solvent of 2.8 mL of water and 5.6 mL of ethanol; after chloroauric acid dissolved completely, weighing and dissolving 14 mg of sodium citrate and 6 mg of cetyl trimethyl ammonium bromide in the aqueous solution of chloroauric acid under the condition of magnetic stirring; weighing and dissolving 1.9 mg of sodium borohydride and 17.6 mg of ascorbic acid in 10 mL of deionized water, respectively, obtaining 10 mL of $5\times10^{-3}$ mol/L aqueous solution of sodium borohydride and 10 mL of $1\times10^{-2}$ mol/L aqueous solution of ascorbic acid; under the condition of magnetic stirring, adding 0.04 mL aqueous solution of sodium borohydride into the aqueous solution of chloroauric acid, stirring and reacting for 5 min, and then adding 1.56 mL of $1\times10^{-2}$ mol/L aqueous solution of ascorbic acid into the aqueous solution of chloroauric acid, continue to react for 30 min, then obtaining 10 mL of Au nano-particles collosol containing $1\times10^{-3}$ mol/L of Au; adding 0.006 g of PVP into 6 mL of obtained Au nano-particles collosol, and magnetically stirring for 8 h. The surface-treated Au nano-particles were obtained.

Preparation of 0.01 mol of $SrWO_4:5\times10^{-4}Au$

Pipetting 10 mL of 1 mol/L $Sr(NO_3)_3$ solution, 12.5 mL of 1 mol/L $(NH_4)_2WO_4$ solution (excess 25%) and adding into a beaker, then adding 20 mL of ethanol, stirring thoroughly to obtain mixed solution of nitrate, adding citric acid of 5 mL-water-20 mL-ethanol (containing 4.2028 g of citric acid monohydrate; the molar ratio of the citric acid to total amount of ions of the mixed solution is 2:1) and 2.025 g of PEG (0.03 g/ml, PEG having a relative molecular mass of 6000) into the mixed solution, stirring thoroughly, regulating the pH value of reaction solution to about 3; taking 5 mL of the above-mentioned treated metal particles solution, heating in a water bath at 90° C. while stirring for 2 h to obtain collosol; completely drying the collosol at 150° C. to obtain gel; placing the gel into high temperature furnace, calcining at 900° C. for 0.5 h, cooling to room temperature, fluorescent powders $SrWO_4:5\times10^{-4}Au$ were obtained after grinding.

Example 3

Preparation of Ag Nano-Particles Collosol: weighing and dissolving 3.40 mg of silver nitrate $(AgNO_3)$ in 18.4 mL of deionized water; after silver nitrate dissolved completely, weighing and dissolving 22 mg of sodium citrate and 20 mg of PVP in the aqueous solution of silver nitrate under the condition of magnetic stirring; weighing and dissolving 5.7 mg of sodium borohydride in mixed solvent of 2 mL of deionized water and 8 mL of ethanol, obtaining 10 ml of $1.5\times10^{-2}$ mol/L aqueous solution of sodium borohydride; under the condition of magnetic stirring, adding 1.6 mL of $1.5\times10^{-2}$ mol/L aqueous solution of sodium borohydride into the aqueous solution of silver nitrate at once, continue to react for 10 min, then obtaining 20 mL of Ag nano-particles collosol containing $1\times10^{-3}$ mol/L of Ag; adding 1 g of PVP into the Ag nano-particles collosol, and magnetically stirring for 6 h. The surface-treated Ag nano-particles were obtained.

Preparation of 0.01 mol of $CaWO_4:5\times10^{-5}Ag$

Pipetting 5 mL of 2 mol/L $Ca(NO_3)_3$ solution, 5.5 mL of 2 mol/L $(NH_4)_2WO_4$ solution (excess 10%) and adding into a beaker, then adding 0.5 mL of ethanol, stirring thoroughly to obtain mixed solution of nitrate, adding citric acid of 5 mL-water-20 mL-ethanol (containing 8.4056 g of citric acid monohydrate; the molar ratio of the citric acid to total amount of ions of the mixed solution is 4:1) and 3.6 g of PEG (0.1 g/ml, PEG having a relative molecular mass of 10000) into the mixed solution, stirring thoroughly, regulating the pH value of reaction solution to about 4; taking 0.5 mL of the above-mentioned treated metal particles solution, heating in a water bath at 85° C. while stirring for 5 h to obtain collosol; completely drying the collosol at 120° C. to obtain gel; placing the gel into high temperature furnace, calcining at 800° C. for 2 h, cooling to room temperature, fluorescent powders $CaWO_4:5\times10^{-5}Ag$ were obtained after grinding. Fluorescent powders $CaWO_4$ were prepared at the same conditions.

Figure 2:
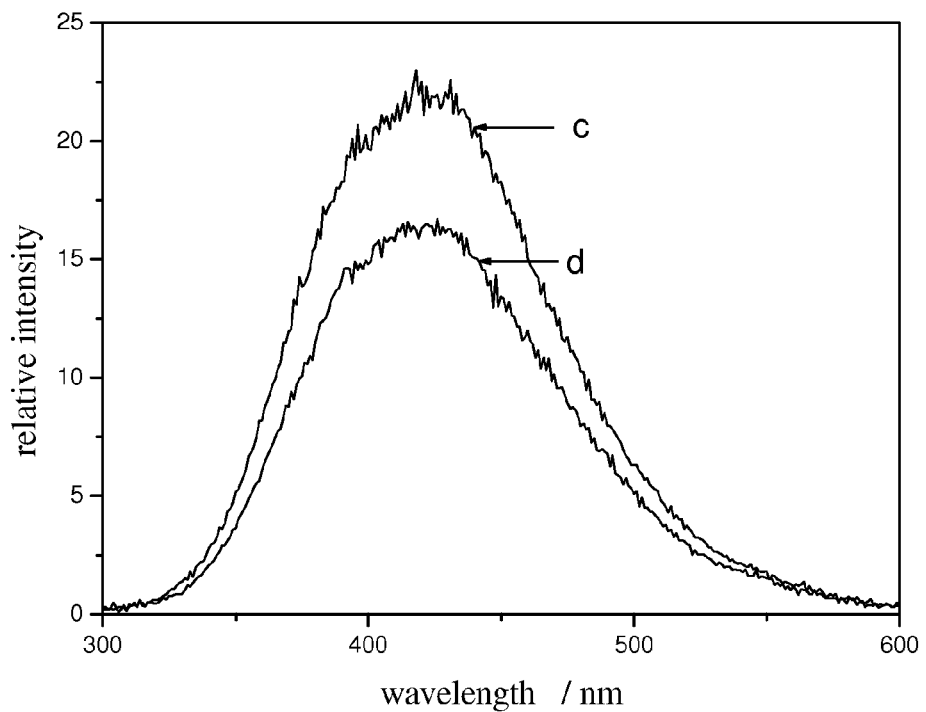
FIG. 2 is comparison between the spectrums of fluorescent materials prepared in Example 3 excited by cathode ray under 3.0 KV acceleration voltage; herein, curve c is emission spectrum of the fluorescent materials $CaWO_4:5 \times 10^{-5}Ag$ adding metal nano-particles; curve d is emission spectrum of the fluorescent materials $CaWO_4$ without adding Ag nano-particles.

FIG. 2 is comparison between the spectrums of fluorescent materials prepared in Example 3 excited by cathode ray under 3.0 KV acceleration voltage; herein, curve c is emission spectrum of the fluorescent materials $CaWO_4:5\times10^{-5}Ag$ adding metal nano-particles; curve d is emission spectrum of the fluorescent materials $CaWO_4$ without adding Ag nano-particles. This figure indicated that such fluorescent powders were blue fluorescent powders; the luminous intensity of samples can be increased by 35% after being doped with metals.

Example 4

Preparation of Pd Nano-Particles Collosol

Weighing and dissolving 0.43 mg of palladium chloride $(PdCl_2 \cdot 2H_2O)$ in 8.5 mL of deionized water; after palladium chloride dissolved completely, weighing and dissolving 11.0 mg of sodium citrate and 4.0 mg of sodium dodecyl sulfate in the aqueous solution of palladium chloride under the condition of magnetic stirring; weighing and dissolving 3.8 mg of sodium borohydride in mixed solvent of 7.5 mL of deionized water and 2.5 mL of ethanol, obtaining $1\times10^{-2}$ mol/L reducing aqueous solution of sodium borohydride; under the condition of magnetic stirring, adding rapidly 0.48 mL of $1\times10^{-2}$ mol/L aqueous solution of sodium borohydride into the aqueous solution of palladium chloride, continue to react for 20 min, then obtaining 10 mL of Pd nano-particles collosol containing $1\times10^{-4}$ mol/L of Pd; adding 0.5 g of PVP into 10 mL of the obtained Pd nano-particles collosol, and magnetically stirring for 4 h. The surface-treated Pd nano-particles were obtained.

Preparation of 0.01 mol of $BaWO_4:5\times10^{-5}Pd$

Pipetting 5 mL of 2 mol/L $Ba(NO_3)_3$ solution, 5 mL of 0.2 mol/L $(NH_4)_{10}H_2(W_2O_7)_6$ solution (excess 20%) and adding into a beaker, then adding 1 mL of ethanol, stirring thoroughly to obtain mixed solution of nitrate, adding citric acid of 5 mL-water-20 mL-ethanol (containing 12.6084 g of citric acid monohydrate; the molar ratio of the citric acid to total amount of ions of the mixed solution is 6:1) and 2.16 g of PEG (0.06 g/ml, PEG having a relative molecular mass of 20000) into the mixed solution, stirring thoroughly, regulating the pH value of reaction solution to about 3; taking 5 mL of the above-mentioned treated metal particles solution, heating in a water bath at 80° C. while stirring for 12 h to obtain collosol; completely drying the collosol at 120° C. to obtain gel; placing the gel into high temperature furnace, calcining at 700° C. for 5 h, cooling to room temperature, fluorescent powders $BaWO_4:5\times10^{-5}Pd$ were obtained after grinding.

Example 5

Preparation of Pt/Au Nano-Particles Collosol weighing and dissolving 6.2 mg of chloroauric acid $(AuCl_3.HCl.4H_2O)$ and 7.8 mg of chloroplatinic acid $(H_2PtCl_6.6H_2O)$ in mixed solvent of 14 mL and 14 mL of ethanol; after dissolved completely, weighing and dissolving 22 mg of sodium citrate and 20 mg of PVP in the mixed solution under the condition of magnetic stirring; weighing and dissolving 5.7 mg of fresh-made sodium borohydride 10 mL of deionized water, obtaining 10 mL of $1.5\times10^{-2}$ mol/L aqueous solution of sodium borohydride; under the condition of magnetic stirring, adding 2 mL of $1.5\times10^{-2}$ mol/L aqueous solution of sodium borohydride into the mixed solution at once, continue to react for 20 min, then obtaining 30 mL of Pt/Au nano-particles collosol containing $1\times10^{-3}$ mol/L of total metal particles; adding 2 g of PVP into Pt/Au nano-particles collosol, and magnetically stirring for 24 h. The surface-treated Pt/Au nano-particles were obtained.

Preparation of 0.01 mol of $Ca_{0.5}Ba_{0.5}WO_4:1\times10^{-4}Pt/Au$

According to the general formula, adding 10 mL of 1 mL/L $(NH_4)_2WO_4$ solution into a beaker, then adding 1 mL of the above-mentioned treated metal particles solution, stirring for 10 min; then dripping mixed solution of 5 mL of 1 ml/L $Ca(NO_3)_2$ and 5 mL of 1 ml/L $Ba(NO_3)_2$ into the above solution, regulating pH to 8, stirring for 0.5 h; transferring the solution to hydrothermal reactor, then keeping the temperature constant at 120° C. for 72, after that, cooling, taking out and filtrating, rinsing with water and alcohols, drying; at last, placing the dry products into high temperature furnace, calcining at 500° C. for 7 h, cooling to room temperature, tungstate fluorescent powders $Ca_{0.5}Ba_{0.5}WO_4:1\times10^{-4}Pt/Au$ were obtained after grinding.

Example 6

Preparation of Ag Nano-Particles Collosol weighing and dissolving 3.40 mg of silver nitrate $(AgNO_3)$ in 18.4 mL of deionized water; after silver nitrate dissolved completely, weighing and dissolving 22 mg of sodium citrate and 20 mg of PVP in the aqueous solution of silver nitrate under the condition of magnetic stirring; weighing and dissolving 5.7 mg of sodium borohydride in 10 mL of deionized water, obtaining 10 mL of $1.5\times10^{-2}$ mol/L aqueous solution of sodium borohydride; under the condition of magnetic stirring, adding 1.6 mL of $1.5\times10^{-2}$ mol/L aqueous solution of sodium borohydride into the aqueous solution of silver nitrate at once, continue to react for 10 min, then obtaining 20 mL of Ag nano-particles collosol containing $1\times10^{-3}$ mol/L of Ag; adding 1 g of PVP into Ag nano-particles collosol, and magnetically stirring for 3 h. The surface-treated Ag nano-particles were obtained.

Preparation of 0.01 mol of $CaWO_4:5\times10^{-5}Ag$

According to the general formula, adding 10 mL of 1 mL/L $Na_2WO_4$ solution into a beaker, then adding 0.5 mL of the above-mentioned treated metal particles solution, stirring for 60 min; then dripping 10 mL of 1 ml/L $Ca(NO_3)_2$ solution into the above solution, regulating pH to 10, stirring for 4 h; transferring the solution to hydrothermal reactor, then keeping the temperature constant at 200° C. for 72, after that, cooling, taking out and filtrating, rinsing with water and alcohols, drying; at last, placing the dry products into high temperature furnace, calcining at 600° C. for 3 h, cooling to room temperature, tungstate fluorescent powders $CaWO_4:5\times10^{-5}Ag$ were obtained after grinding. Tungstate fluorescent powders $CaWO_4$ were prepared at the same conditions.

Figure 3:
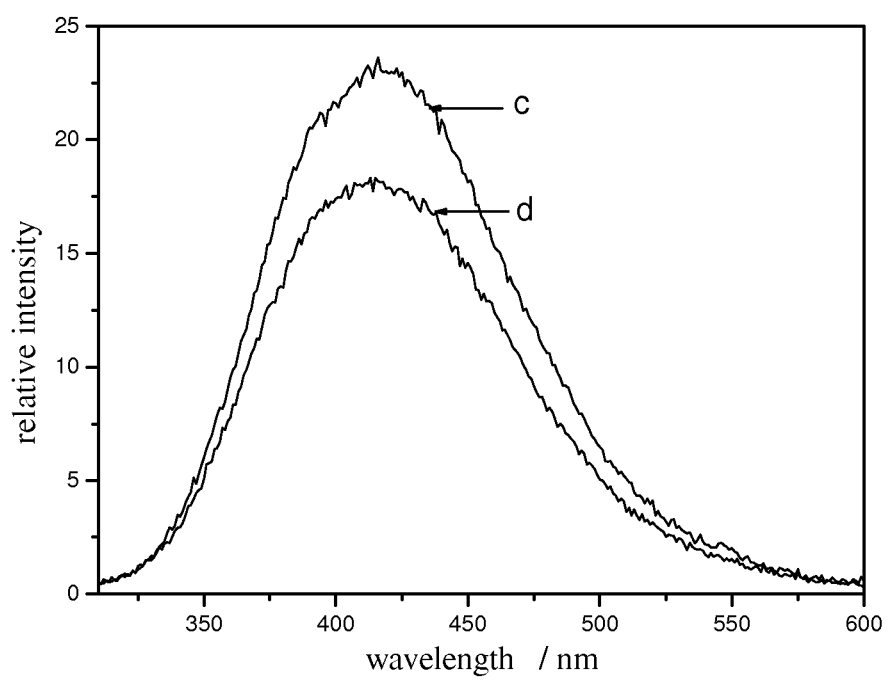
FIG. 3 is comparison between the spectrums of fluorescent materials prepared in Example 6 excited by cathode ray under 7.0 KV acceleration voltage; herein, curve c is emission spectrum of the fluorescent materials $CaWO_4:5 \times 10^{-5}Ag$ adding metal nano-particles; curve d is emission spectrum of the fluorescent materials $CaWO_4$ without adding Ag nano-particles.

FIG. 3 is comparison between the spectrums of fluorescent materials prepared in Example 6 excited by cathode ray under 7.0 KV acceleration voltage; herein, curve c is emission spectrum of the fluorescent materials $CaWO_4:5\times10^{-5}Ag$ adding metal nano-particles; curve d is emission spectrum of the fluorescent materials $CaWO_4$ without adding Ag nano-particles. This figure indicated that such fluorescent powders were blue fluorescent powders; the luminous intensity of samples can be increased by 28% after being doped with metals.

Example 7

Preparation of Ag Nano-Particles Collosol weighing and dissolving 3.40 mg of silver nitrate $(AgNO_3)$ in mixed solvent of 2.3 mL of ethanol and 16.1 mL of water; after silver nitrate dissolved completely, weighing and dissolving 22 mg of sodium citrate and 20 mg of PVP in the aqueous solution of silver nitrate under the condition of magnetic stirring; weighing and dissolving 5.7 mg of sodium borohydride in mixed solvent of 5 mL of deionized water and 5 mL of ethonal, obtaining 10 mL of $1.5\times10^{-2}$ mol/L aqueous solution of sodium borohydride; under the condition of magnetic stirring, adding 1.6 mL of $1.5\times10^{-2}$ mol/L aqueous solution of sodium borohydride into the aqueous solution of silver nitrate at once, continue to react for 10 min, then obtaining 20 mL of Ag nano-particles collosol containing $1\times10^{-3}$ mol/L of Ag; adding 0.5 g of PVP into Ag nano-particles collosol, and magnetically stirring for 6 h. The surface-treated Ag nano-particles were obtained.

Preparation of 0.01 mol of $BaWO_4:1\times10^{-4}Ag$

According to the general formula, adding 10 mL of 1 mL/L $Na_2WO_4$ solution into a beaker, then adding 1 mL of the above-mentioned treated metal particles solution, stirring for 30 min; then dripping 10 mL of 1 ml/L $Ba(NO_3)_2$ solution into the above solution, regulating pH to 12, stirring for 1 h; transferring the solution to hydrothermal reactor, then keeping the temperature constant at 250° C. for 12, after that, cooling, taking out and filtrating, rinsing with water and alcohols, drying; at last, placing the dry products into high temperature furnace, calcining at 900° C. for 0.5 h, cooling to room temperature, tungstate fluorescent powders $BaWO_4$: $1\times10^{-4}Ag$ were obtained after grinding.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. Tungstate fluorescent powders consisting of xM nano-particles and $RWO_4$, wherein R is one or two of Ca, Sr and Ba metal elements; M is one or two of Ag, Au, Pt and Pd nano-particles; x is molar ratio of M nano-particles to $RWO_4$, x is in the range of $0<x\leq1\times10^{-3}$.

2. A preparation method of tungstate fluorescent powders comprising:
adding surface treating agent into M nano-particles collosol, stirring for 3~24 h to carry out surface treatment to achieve surface treated M nano-particles collosol; M is one or two of Ag, Au, Pt and Pd nano-particles; said surface treating agent is polyvinyl pyrrolidone, and mass concentration of said surface treating agent in M nano-particles collosol is in a range of 0.001 g/mL to 0.1 g/mL;
mixing R salts with tungstate solution according to the composition stoichiometry of R and W elements in the general formula $RWO_4$ in the molar ratio of 1:1 to about 1:1.25, then adding ethanol, stirring, adding solution of ethanol and water and citric acid monohydrate in a ratio of citric acid to R ions of about 1:1 to about 6:1; then adding about 0.01-0.1 g/mL polyethylene glycol, having a relative molecular mass of about 2000-20,000 and maintaining pH of the solution in the range of about 2-4, obtaining chelate solution; R is one or two of Ca, Sr and Ba metal elements;
adding the surface treated M nanoparticles to the chelate solution in a molar amount of x where $0<x\leq10^{-3}$; drying the mixture at about 80-150° C. to obtain a gel; calcining the gel at about 600-900° C. for about 0.5-7 hours, cooling and grinding to obtain the fluorescent powder.

3. The preparation method of tungstate fluorescent powders according to claim 2, wherein said M nano-particles are produced as follows:
dissolving compound used as source of M in water solvent or mixed solution of ethanol and water in volume ratio of 1:7~4:1 to achieve solution containing M ions; said compound used as source of M is one or two of silver nitrate, chloroauric acid, chloroplatinic acid and palladium chloride;
adding successively assistant agent and reducing agent solution into the solution containing M ions to carry out redox reaction for 10~45 min, then obtaining M nano-particles collosol; a mass concentration of assistant agent in the solution containing M ions is in a range of $1.5\times10^{-4}$ g/mL-$2.1\times10^{-3}$ g/mL; said assistant agent is at least one of polyvinyl pyrrolidone, sodium citrate, cetyl trimethyl ammonium bromide, sodium dodecyl sulfate and sodium dodecyl sulfonate; a molar concentration of said reducing agent solution is in a range of $1\times10^{-3}$-$1\times10^{-2}$ mol/L; reducing agent is at least one of hydrazine hydrate, ascorbic acid and sodium borohydride; solvent of said reducing agent solution is a mixed solvent of water and ethanol in a volume ratio of 1:9-2:1; a molar ratio of said reducing agent to M ions is in a range of 1.2:1-4.8:1.

4. A preparation method of tungstate fluorescent powders comprising:
adding surface treating agent into M nano-particles collosol, stirring for 3-24 h to carry out surface treatment to achieve surface treated M nano-particles collosol; M is one or two of Ag, Au, Pt and Pd nano-particles; said surface treating agent is polyvinyl pyrrolidone, and mass concentration of said surface treating agent in M nano-particles collosol is in a range of 0.001 g/mL-0.1 g/mL;
mixing the surface treated M nano-particles collosol and tungstate solution according to the composition stoichiometry of elements in $RWO_4$:xM where x is in a range of $0<x\leq0.001$, stirring for about 10-60 minutes, dripping R salts into the mixed solution to regulate the pH value of the mixed solution so it is maintained in a range of about 8-12; stirring for about 0.5-4 hours to form an alkaline mixed solution; R is one or two of Ca, Sr and Ba metal elements; $0<x\leq0.5$;
heating the alkaline mixed solution in a hydrothermal reactor at about 120-250° C. for about 12-72 hours, cooling, rinsing, and drying to achieve powders;
heating treating the dried powder at about 500° C.-900° C. for about 0.5-7 hours, cooling and grinding the powders to achieve tungstate fluorescent consisting of xM nano-particles and $RWO_4$.

5. The preparation method of tungstate fluorescent powders according to claim 4, wherein said M nano-particles are produced as follows:
dissolving compound used as source of M in water solvent or mixed solvent of ethanol and water in volume ratio of 1:7~4:1 to achieve solution containing M ions; said compound used as source of M is one or two of silver nitrate, chloroauric acid, chloroplatinic acid and palladium chloride;
adding successively assistant agent and reducing agent solution into the solution containing M ions to carry out redox reaction for 10~45 min, then obtaining produce M nano-particles collosol; a mass concentration of assistant agent in the solution containing M ions is in a range of $1.5\times10^{-4}$ g/mL-$2.1\times10^{-3}$ g/mL; said assistant agent is at least one of polyvinyl pyrrolidone, sodium citrate, cetyl trimethyl ammonium bromide, sodium dodecyl sulfate and sodium dodecyl sulfonate; a molar concentration of said reducing agent solution is in a range of $1\times10^{-3}$-$1\times10^{-2}$ mol/L; reducing agent is at least one of hydrazine hydrate, ascorbic acid and sodium borohydride; solvent of said reducing agent solution is a mixed solvent of water and ethanol in a volume ratio of 1:9-2:1; a molar ratio of said reducing agent to M ions is in a range of 1.2:1-4.8:1.

* * * * *